US008762615B2

(12) United States Patent
Easton et al.

(10) Patent No.: US 8,762,615 B2
(45) Date of Patent: Jun. 24, 2014

(54) DEQUEUE OPERATION USING MASK VECTOR TO MANAGE INPUT/OUTPUT INTERRUPTIONS

(75) Inventors: Janet R. Easton, Woodstock, NY (US); Norbert Hagspiel, Wendlingen (DE); Bernd Nerz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/332,427

(22) Filed: Dec. 21, 2011

(65) Prior Publication Data

US 2013/0166803 A1 Jun. 27, 2013

(51) Int. Cl.
*G06F 9/48* (2006.01)

(52) U.S. Cl.
USPC .......................................... 710/262; 710/263

(58) Field of Classification Search
USPC .................................. 710/260–269
See application file for complete search history.

(56) References Cited

U.S. PATENT DOCUMENTS

| | | | |
|---|---|---|---|
| 5,222,215 A | 6/1993 | Chou et al. | |
| 5,937,199 A * | 8/1999 | Temple | 710/262 |
| 6,845,419 B1 * | 1/2005 | Moyer | 710/264 |
| 7,478,185 B2 | 1/2009 | Balazich et al. | |
| 7,707,343 B2 * | 4/2010 | Sato | 710/262 |
| 8,266,358 B2 * | 9/2012 | Katoh | 710/260 |
| 2008/0091867 A1 * | 4/2008 | Plondke et al. | 710/261 |
| 2009/0248935 A1 * | 10/2009 | Ehrlich et al. | 710/264 |

OTHER PUBLICATIONS

"z/Architecture Principles of Operation," IBM Publication No. SA22-7832-08, Ninth Edition, Aug. 2010.

* cited by examiner

*Primary Examiner* — Glenn A Auve
(74) *Attorney, Agent, or Firm* — John E. Campbell; Blanche E. Schiller, Esq.; Heslin Rothenberg Farley & Mesiti P.C.

(57) ABSTRACT

A command is issued to reset one or more pending interrupt indicators and arbitrate for ownership of the interrupt. Responsive to a processor receiving the command, a check is made of a selected pending interrupt indicator. If the selected pending interrupt indicator is not set, another pending interrupt indicator is checked, instead of providing a negative response and reissuing the command. In this way, one dequeue command can replace multiple dequeue commands and the overhead of leaving and re-entering the interrupt handler is reduced. A negative response is reserved for those situations in which there are no pending interrupt indicators to be reset.

20 Claims, 7 Drawing Sheets

|  | PU0 | PU1 | PU2 | PU3 |
|---|---|---|---|---|
| ZMT | 1 1 0 0 0 | 1 1 1 0 0 | 0 1 0 0 0 | 0 0 1 0 0 |
| PIA | 1 1 1 0 0 | 1 1 1 0 0 | 1 1 1 0 0 | 1 1 1 0 0 |

DEQUEUE

600a:
| | PU0 | PU1 | PU2 | PU3 |
|---|---|---|---|---|
| 0 | [0] 1 1 0 0 | 0 1 1 0 0 | 0 1 1 0 0 | 0 1 1 0 0 |
| 1 | 0 0 1 0 0 | 0 [0] 1 0 0 | 0 0 1 0 0 | 0 0 1 0 0 |
| 2 | 0 0 1 0 0 | 0 0 1 0 0 | 0 ▨0▨ 1 0 0 | 0 0 1 0 0 |
| 3 | 0 0 0 0 0 | 0 0 0 0 0 | 0 0 0 0 0 | 0 0 [0] 0 0 |

600b:
| | PU0 | PU1 | PU2 | PU3 |
|---|---|---|---|---|
| 1 | 0 1 1 0 0 | [0] 1 1 0 0 | 0 1 1 0 0 | 0 1 1 0 0 |
| 3 | 0 1 0 0 0 | 0 1 0 0 0 | 0 1 0 0 0 | 0 1 [0] 0 0 |
| 2 | 0 0 0 0 0 | 0 0 0 0 0 | 0 [0] 0 0 0 | 0 0 0 0 0 |
| 0 | ▨0▨▨0▨ 0 0 0 | 0 0 0 0 0 | 0 0 0 0 0 | 0 0 0 0 0 |

600c:
| | PU0 | PU1 | PU2 | PU3 |
|---|---|---|---|---|
| 2 | 1 0 1 0 0 | 1 0 1 0 0 | 1 [0] 1 0 0 | 1 0 1 0 0 |
| 1 | 0 0 1 0 0 | [0] 0 1 0 0 | 0 0 1 0 0 | 0 0 1 0 0 |
| 0 | ▨0▨▨0▨ 1 0 0 | 0 0 1 0 0 | 0 0 1 0 0 | 0 0 1 0 0 |
| 3 | 0 0 0 0 0 | 0 0 0 0 0 | 0 0 0 0 0 | 0 0 [0] 0 0 |

600d:
| | PU0 | PU1 | PU2 | PU3 |
|---|---|---|---|---|
| 2 | 1 0 1 0 0 | 1 0 1 0 0 | 1 [0] 1 0 0 | 1 0 1 0 0 |
| 1 | 0 0 1 0 0 | [0] 0 1 0 0 | 0 0 1 0 0 | 0 0 1 0 0 |
| ENQUEUE | [1] 0 1 0 0 | [1] 0 1 0 0 | [1] 0 1 0 0 | [1] 0 1 0 0 |
| 0 | [0] 0 1 0 0 | 0 0 1 0 0 | 0 0 1 0 0 | 0 0 1 0 0 |
| 3 | 0 0 0 0 0 | 0 0 0 0 0 | 0 0 0 0 0 | 0 0 [0] 0 0 |

[0] POSITIVE RESPONSE IS SENT TO THIS PU
▨0▨ NEGATIVE RESPONSE IS SENT TO THIS PU
[1] PIA BIT IS SET WITH ENQUEUE CMD FROM ANY SOURCE

FIG. 6

DEQUEUE OPERATION USING MASK VECTOR TO MANAGE INPUT/OUTPUT INTERRUPTIONS

BACKGROUND

This invention relates, in general, to processing within a computing environment, and in particular, to managing input/output (I/O) interruptions within such an environment.

Interruptions are used to alert processors that action is to be taken. There are different types of interruptions, including input/output (I/O) interruptions, which are initiated by I/O components of a computing environment. As an example, adapters external, but coupled to, a central processing complex initiate I/O interruptions for processors of a central processing complex.

In some computing environments, including one or more of those in which the central processing complex is based on the z/Architecture® offered by International Business Machines Corporation, an I/O interruption initiated by an external adapter is first seen as an Alert attention to a processor of the environment. The Alert attention is processed to determine whether an interruption initiative is to be set. If the initiative is to be set, then the processor sets it in an Interruption Queue Header under control of a lock. When the queue transitions from the empty state to the non-empty state, the processor initiates a broadcast of a command to all of the processors instructing them to set the initiative at the processors.

In another example, an external adapter directly initiates the setting of an interruption initiative, such as an I/O interruption initiative, at one or more of the processors. As one example, the adapter directly sends a request to a system controller (e.g., hardware) coupled to the adapter and the processors. The request designates a particular zone and I/O interruption subclass within the computing environment for which a pending interruption is to be set. The system controller then sends a command based on the request to the processors instructing them to set the initiative.

Subsequent to setting the interruption initiative, processors arbitrate to handle the interruption initiative, including resetting a pending interruption indicator.

BRIEF SUMMARY

Shortcomings of the prior art are overcome and additional advantages are provided through the provision of a computer program product for facilitating processing of interruptions. The computer program product includes a storage medium readable by a processing circuit and storing instructions for execution by the processing circuit for performing a method. The method includes, for instance, obtaining, by a processor, a command including a mask indication, the mask indication including a plurality of indicators; responsive to obtaining the mask indication, selecting a set indicator from the mask indication; determining whether a pending interrupt indicator corresponding to the set indicator is set; and responsive to the determining indicating the corresponding pending interrupt indicator is not set, repeating at least one time for at least one other set indicator in the mask indication the determining in an attempt to reset a pending interrupt indicator, the repeating being performed without re-issuing the command.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 6 depicts a set of examples of indicators being reset, in accordance with an aspect of the present invention.

DETAILED DESCRIPTION

In accordance with an aspect of the present invention, processing of pending interrupt indicators is facilitated. A command is issued by one or more processors and received by processors of the computing environment to reset pending interrupt indicators. Responsive to a processor receiving the command, the processor checks a selected pending interrupt indicator. If the selected pending interrupt indicator is not set, another pending interrupt indicator is checked, instead of providing a negative response and reissuing the command. Pending interrupt indicators are checked until one is reset or there are no other indicators to be checked. If there are no indicators to be reset, then a negative response is provided, assuming the processor performing the checking is the same processor that issued the command.

Figure 1:
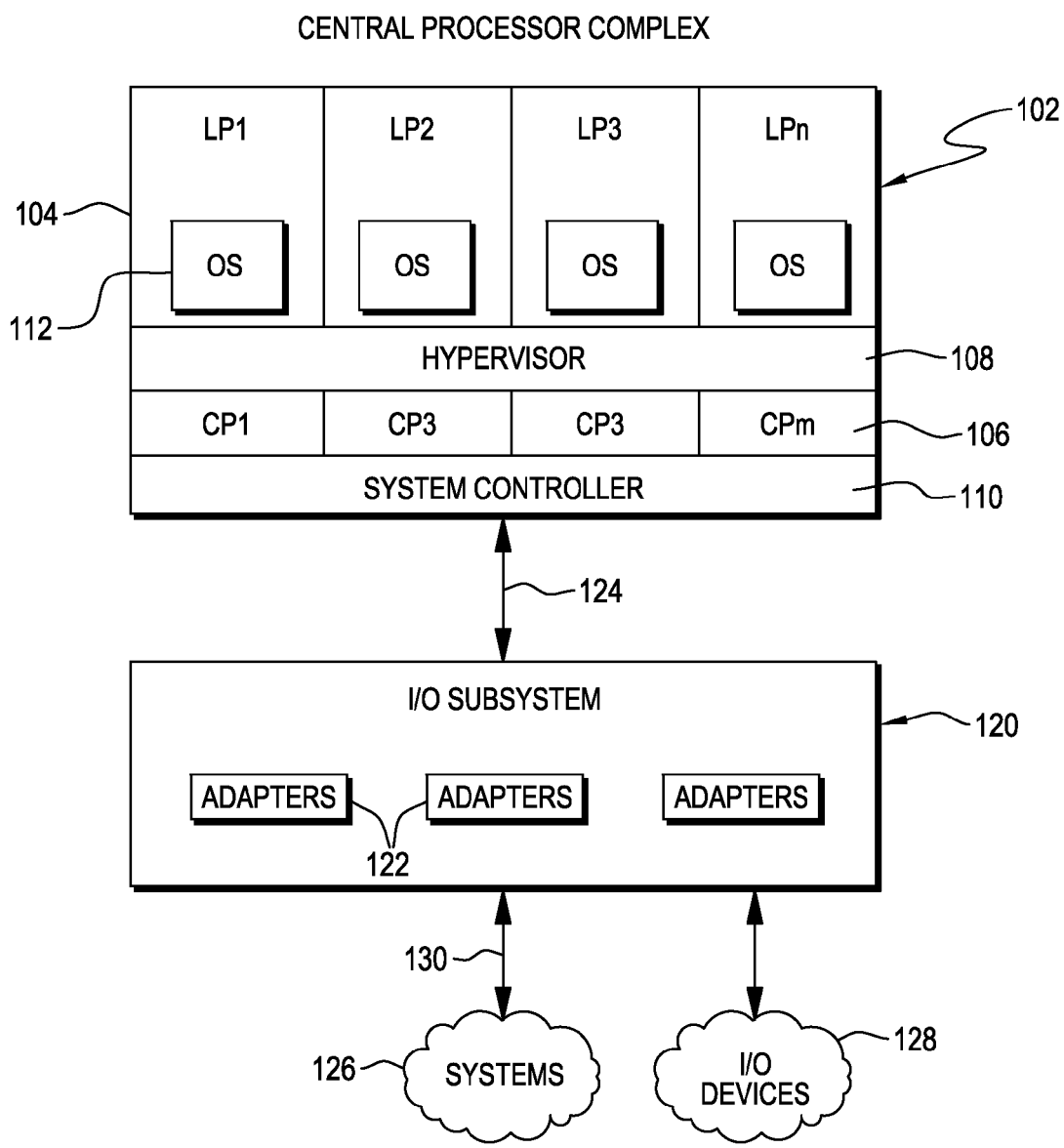
FIG. 1 depicts one embodiment of a computing environment to incorporate and use one or more aspects of the present invention.

One embodiment of a computing environment to incorporate and use one or more aspects of the present invention is described with reference to FIG. 1. A computing environment 100 is based, for instance, on the z/Architecture® offered by International Business Machines Corporation, Armonk, N.Y. The z/Architecture® is described in an IBM® publication entitled, "z/Architecture Principles of Operation," IBM Publication No. SA22-7832-08, Ninth Edition, August 2010, which is hereby incorporated herein by reference in its entirety. In one example, a computing environment based on the z/Architecture® includes a System z® server, offered by International Business Machines Corporation, Armonk, N.Y. IBM®, z/Architecture® and System z®, as well as z/OS® mentioned below, are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to an input/output (I/O) subsystem 120. Central processor complex 102 includes, for instance, one or more partitions 104 (e.g., logical partitions LP1-LPn), one or more central processors 106 (e.g., CP1-CPm), a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time sliced manner.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the z/OS® operating system, offered by International Business Machines Corporation, Armonk, N.Y. Further, in this example, each logical partition has assigned thereto a portion of system main storage (memory), which is referred to as a zone.

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processors. One example of hypervisor 108 is the Processor Resource/Systems Manager™ (PR/SM), offered by International Business Machines Corporation, Armonk, N.Y.

Central processors 106 are coupled to, but separate from, system controller 110. System controller 110 is, for instance, a hardware component that controls access to memory and caches within the processors, and communicates between the processors and input/output subsystem 120. The system controller is responsible for the queuing, serialization and execution of requests made by the central processing units (a.k.a., processors or processing units) and the I/O subsystem. In one example, it is responsible for sending commands to particular processors and/or broadcasting commands to multiple processors. The system controller may be a centralized component or its functions may be distributed. The system controller is not a processor or core. For example, it does not execute user applications. Instead, it is the communications mechanism between the I/O subsystem and the processors.

The I/O subsystem is coupled to the system controller via one or more buses 124, as an example. Further, the I/O subsystem is coupled to other systems 126 (e.g., other CPCs, etc.) and/or I/O devices 128 (e.g., control units, input devices, printers, other output devices, etc.) via one or more links 130. As examples, the links include Ethernet, Infiniband® and/or Fibre Channel links. Infiniband® is a registered trademark of the Infiniband Trade Association.

The adapters of the I/O subsystem transform the protocol of the system controller to the protocols of the links (and vice versa) to allow efficient communication between the central processing complex and other systems and/or I/O devices. An adapter receives packets over links 130, and in response thereto, may determine that an interruption initiative is to be set pending at the processors of the computing environment. When an interruption initiative is to be set, either the adapter or a processor responsive to an indication by the adapter sends a request to the system controller, and the system controller instructs the processors to set the pending interruption initiatives. These initiatives are set, in one embodiment, by setting indicators in a pending interruption array described with reference to FIG. 2.

Figure 2:
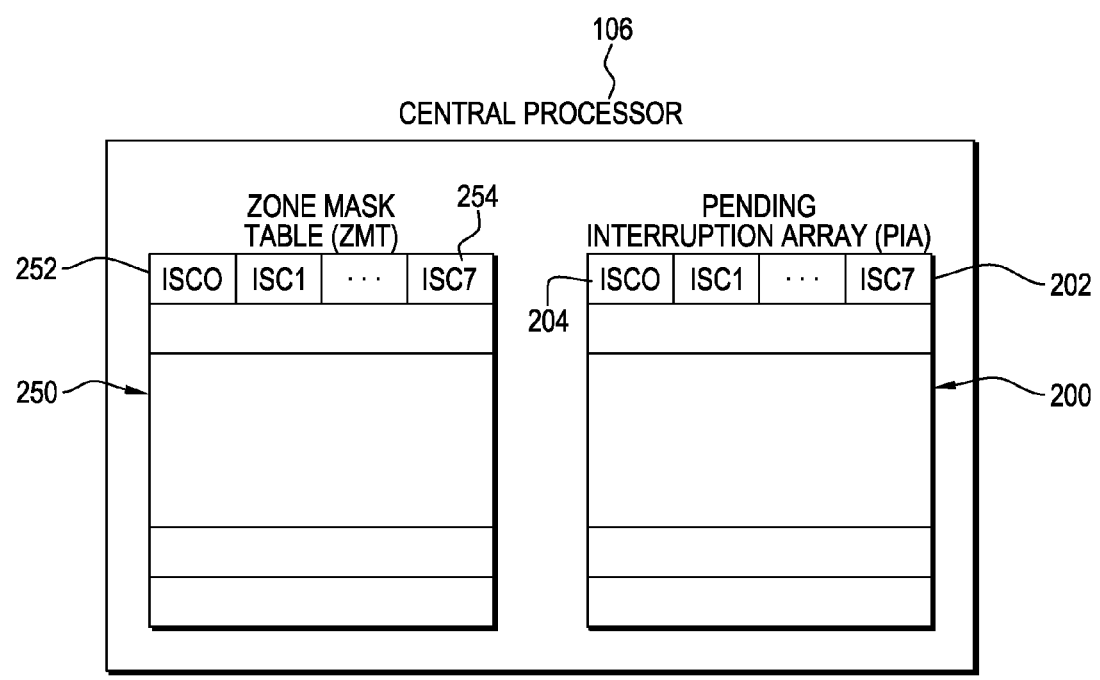
FIG. 2 depicts one embodiment of a zone mask table and a pending interrupt array used in accordance with an aspect of the present invention.

Referring to FIG. 2, a pending interruption array (PIA) 200 is a hardware component residing in a central processor 106. It includes an entry (e.g., a row) 202 for each zone (e.g., memory assigned to a logical partition) within the computing environment. In one example, the computing environment includes 64 zones, and therefore, there are 64 entries in the pending interruption array. Each entry includes an indicator 204 for each I/O interruption subclass (ISC) associated with the zone. An interruption subclass represents one of a plurality of possible subclasses of interruption, and in one example, there are eight interruption subclasses. Therefore, there are eight indicators in each entry, in this example. Each interruption subclass is associated with one or more sources of the interruption. When a bit is turned on in the pending interruption array, it indicates that an interruption is pending for that particular interruption subclass of that zone (i.e., ZONE.ISC).

Each interruption subclass (e.g., ISC0-ISC7) has a corresponding I/O interruption queue that can hold one or more pending interruptions. The I/O interruption queues (e.g., 8 in this example) are located within system memory (e.g., the hardware system area), and each has an interruption queue header (IQH) associated therewith. The interruption queue header includes the initiatives made pending.

To handle an interruption made pending, a zone mask table (ZMT) 250 is employed. The zone mask table also has an entry 252 for each zone of the processing complex and an indicator 254 for each interruption subclass of each zone. Examples of use of the zone mask table and further details associated with the pending interruption array are described in U.S. Pat. No. 7,478,185, entitled "Directly Initiating by External Adapters the Setting of Interruption Initiatives," Balazich et al., issued on Jan. 13, 2009; and U.S. Pat. No. 5,222,215, entitled "CPU Expansive Gradation of I/O Interruption Subclass Recognition," Chou et al., issued on Jun. 22, 1993, each of which is hereby incorporated herein by reference in its entirety.

Figure 4:
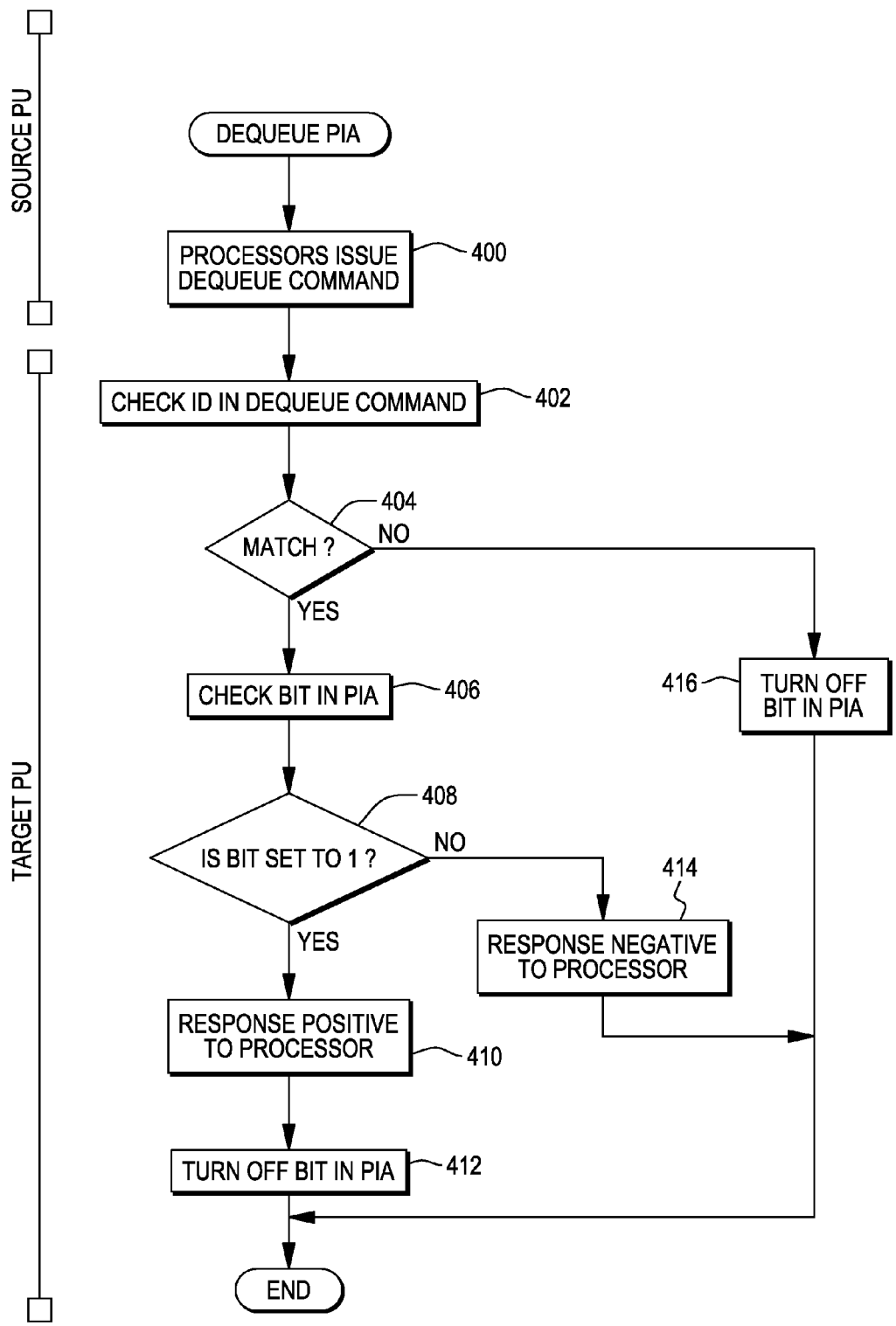
FIG. 4 depicts one embodiment of the logic associated with resetting an indicator of the pending interruption array, in accordance with an aspect of the present invention.
Figure 5:
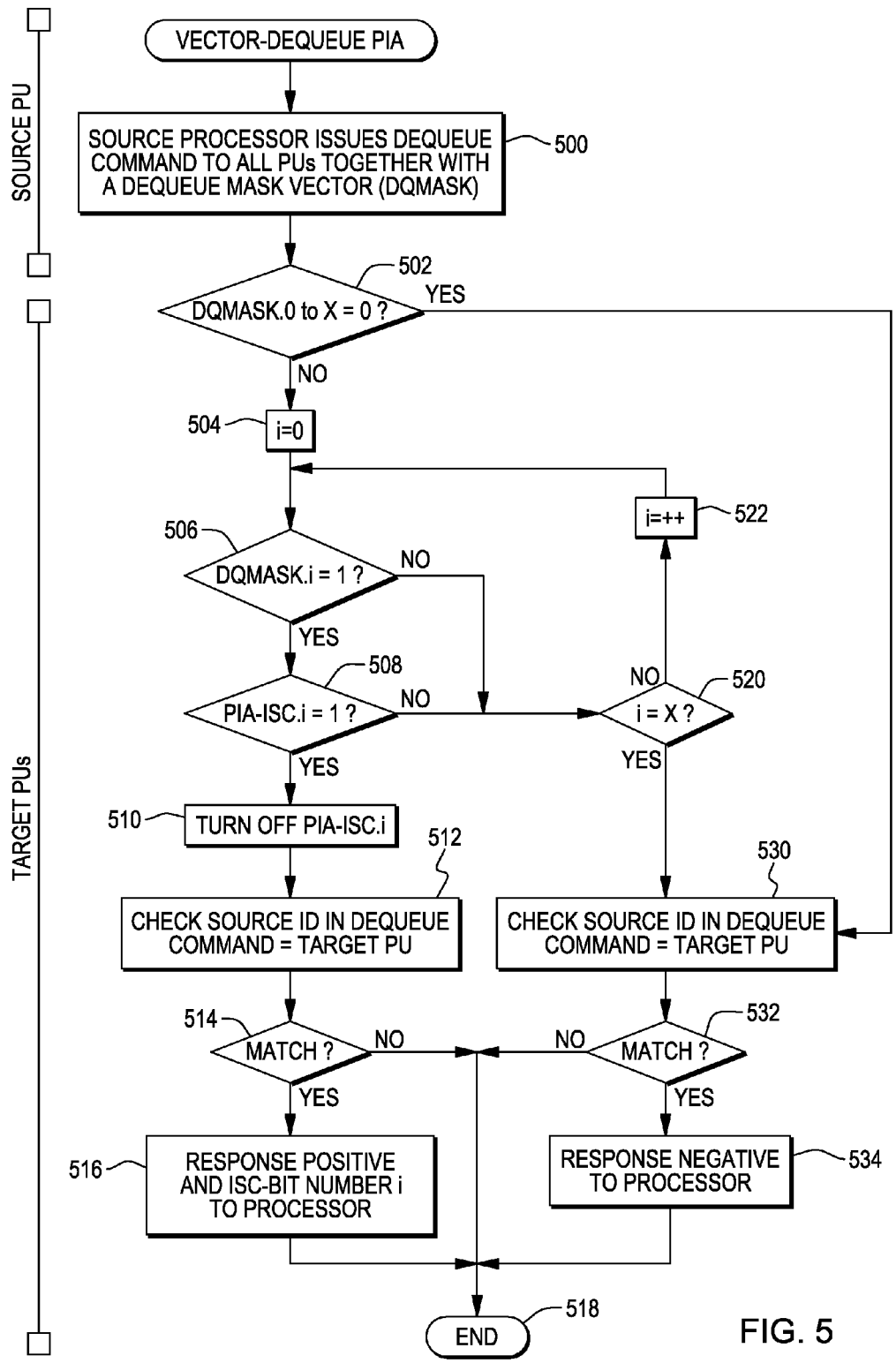
FIG. 5 depicts another embodiment of the logic associated with resetting indicators of the pending interruption array, in accordance with an aspect of the present invention.

Use of the PIA is described in further detail with reference to FIGS. 3-5. In particular, FIG. 3 describes one embodiment of the logic associated with setting the indicators, and FIGS. 4 and 5 depict embodiments of the logic associated with resetting the indicators.

Figure 3:
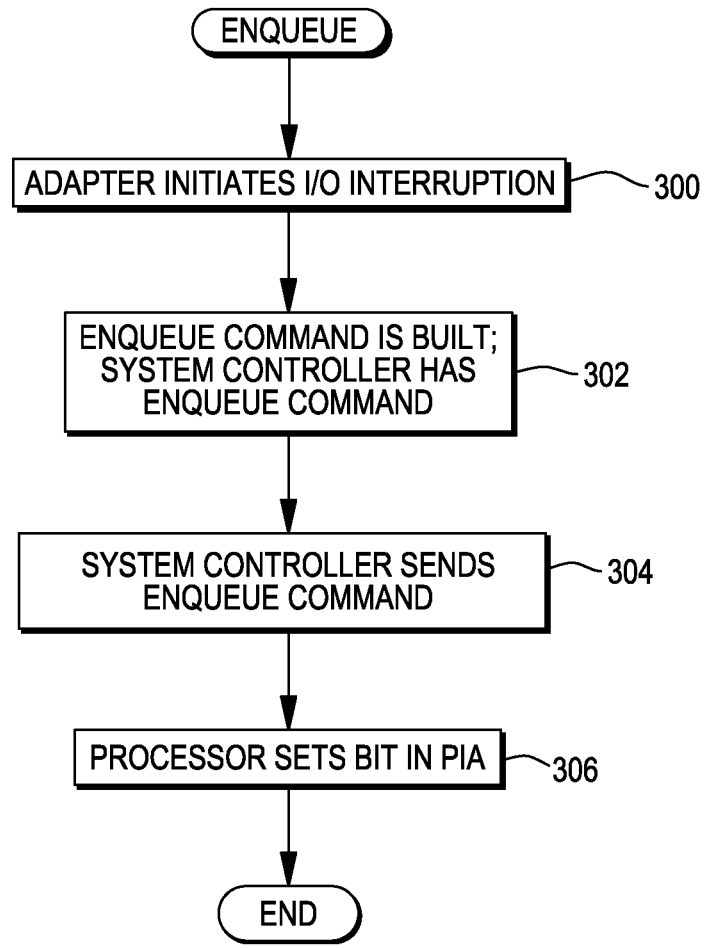
FIG. 3 depicts one embodiment of the logic associated with setting indicators in the pending interruption array, in accordance with an aspect of the present invention.

Referring to FIG. 3, initially, an adapter, which is external to the processors of the CPC, and therefore, referred to as an external adapter, initiates an I/O interruption, STEP 300. This I/O interruption may be in response to a packet received by the adapter. The packet, which is from a source associated with an interruption subclass, is destined for a particular logical partition associated with a zone. Thus, for that zone, and in particular, the interruption subclass of that zone (i.e., ZONE.ISC), the setting of an interruption pending indicator is initiated, as described herein.

The processing of this I/O interruption depends on whether a processor is to handle the interruption for the adapter or whether the adapter is to directly handle the interruption. If the processor is to handle the interruption, the I/O interruption issued by the adapter is seen as an Alert Attention to the processor. Based on the Alert Attention, the processor builds an enqueue command, described below, STEP 302, and sends it to the system controller.

However, if the adapter is handling the interruption, the adapter issues an interruption request that is sent to the system controller. The request sent to the system controller includes the ZONE.ISC, as well as an indication of the type of request. The system controller receives the request and builds an enqueue command based on the request, STEP 302.

To build an enqueue command, either by the processor or system controller, the zone and ISC relating to the interruption is obtained and included in the command, along with a subcommand indicating that a PIA enqueue is to be processed by the processors. That is, in one example, the enqueue command includes a command field indicating this is a PIA enqueue command, as well as the zone and encoded ISC bit within that zone for which the PIA bit is being set, in addition to the id of the source of the command.

The system controller sends the enqueue command to all the processors coupled to the system controller via a serialization point in the system, STEP 304. In another embodiment, the enqueue command is sent to one or more of the processors. Responsive to the sending, in one embodiment, the enqueue commands for the processors are received at a serialization point in the system (e.g., a hardware component in the system controller or other component within the system). The serialization point queues these commands, and then broadcasts them back in series to each of the processors. The ordering in which the enqueue commands are broadcast back is random, but all of the processors see them in the same order.

In response to a processor receiving the enqueue command, the processor sets the bit to one in the PIA, STEP 306. This concludes enqueue processing.

The above processing allows a processor or adapter to directly initiate a setting of an interruption initiative at one or more processors.

In one example, an I/O interrupt is reported whenever at least one of the I/O interrupts is pending in the PIA and enabled by the corresponding mask bit in the ZMT. Reporting an I/O interrupt means that at the next interruptible point, an I/O interrupt handler is called by a hardware trap, which places the processor in millicode mode, in one embodiment. The interrupt handler performs a read to determine the highest priority I/O interrupt bit that is pending. This read is performed using, for instance, a read command.

The read command returns an indication of an I/O interrupt that is pending. Since multiple processors may obtain the same information, each processor requests to process the interrupt. In particular, one or more processors are enabled to handle the interruption, as described in U.S. Pat. No. 5,222,215 entitled "CPU Expansive Gradation of I/O Interruption Subclass Recognition," Chou et al., issued on Jun. 22, 1993, which is hereby incorporated herein by reference in its entirety. In one example, the processors that are enabled arbitrate to handle the interruption, such that only one processor gains control of an interruption for the same ZONE.ISC at one time. One example of arbitration processing is described with reference to FIG. 4.

Referring to FIG. 4, in one embodiment, each processor that is enabled for the interruption issues a dequeue command, STEP 400. The dequeue command includes, for instance, the source processor identifier, i.e., the identifier of the processor issuing the dequeue command, as well as the ZONE.ISC for which the interrupt is pending. This command is sent to the serialization point in the system controller. The serialization point then broadcasts the commands one by one to the target processors so that all of the processors see the same command in the same order, but not necessarily in the same clock cycle.

In response to a processor receiving the command, the processor checks the processor id in the dequeue command, STEP 402. If the processor id in the dequeue command matches the processor id of the processor processing the command, INQUIRY 404, then the processor may have won the arbitration to handle the interruption. Thus, the processor checks the indicator (e.g., bit) in the processor's pending interruption array (PIA) corresponding to the zone and ISC specified in the dequeue command, STEP 406. If the indicator is set to one, INQUIRY 408, then the processor sets a hardware condition sensible by firmware on that processor to indicate a positive response signifying that the processor has priority to process the interruption, STEP 410. Further, the processor turns off the indicator in the PIA, STEP 412.

Returning to INQUIRY 408, if the indicator is not set to one, then the processor sets a hardware condition sensible by firmware indicating a negative response, STEP 414. This indicates that another processor has won the arbitration to handle the interruption.

Returning to INQUIRY 404, if the processor id does not match the identifier in the dequeue command, then the processor turns off the bit in the PIA, STEP 416, and processing concludes.

By using the above dequeue mechanism, it is guaranteed that only one processor handles a particular interruption at any point in time.

In one example, when the interrupt handler is called, it is the highest priority zone number having at least one ISC bit pending together with the encoded highest priority pending PIA-ISC bit number of that zone (determined from the read) that is sent along with the dequeue command. However, in a further embodiment, instead of sending the encoded highest priority PIA-ISC bit number of the zone, the current value of the ZMT entry for the zone is sent as a mask (a.k.a., vector) of bits referred to as the ZMT-ISC mask bits or the ZMT-ISC-mask bits ANDed with the PIA-ISC bits of the zone are sent as a mask. If the ZMT-ISC mask bits are sent, then new incoming PIA-ISC bits are covered. However, if the ZMT-ISC mask bits ANDed with the PIA-ISC bits of the zone are sent, then only the PIA-ISC bits set at the time when the source processor read the information are covered.

One embodiment of the logic associated with sending the ZMT mask bits either with or without being ANDed with the PIA-ISC bits is described with reference to FIG. 5. Initially, a source processor issues a dequeue command to all the processors (or, in another example, a subset thereof), which includes a command field indicating this is a dequeue command, the id of the source processor, the zone and encoded ISC bit along with a dequeue mask vector (DQMASK), STEP 500. This vector has as many bits as ISC bits used per zone in the system. The mask bits can be generated in two different ways: a) DQMASK.i=S-PIA-ISC.i AND S-ZMT-ISC.i; or b) DQMASK.i=S-ZMT-ISC.i, where S-PIA-ISC.i equals the ISC bit in the PIA of the source processor in the pending zone; and S-ZMT-ISC.i equals the ISC bit in the ZMT of the source processor in the pending zone. PIA-ISC.i, also referenced herein, equals the ISC bit in the PIA of the target processor in the zone.

In one example, the dequeue command is received by a serialization point which queues the commands it receives and then sends them to each of the processors in series. The processors see the commands in the same order.

Responsive to a target processor receiving the dequeue command and the DQMASK from the source processor, the target processor performs processing using the DQMASK. This is performed by each target processor receiving the dequeue command.

At the target processor, a determination is made as to whether DQMASK.0 to X, in which X equals the number of ISC bits minus 1, is equal to 0, INQUIRY 502. If it is not equal to zero, then i is initialized to zero, STEP 504. Further, a determination is made as to whether DQMASK.i is equal to 1, INQUIRY 506. If DQMASK.i is equal to 1, then a further determination is made as to whether PIA-ISC.i is equal to 1, STEP 508. If both are set to 1, then PIA-ISC.i is turned off (e.g., set to zero), STEP 510. Additionally, the source identifier in the dequeue command is checked to see if it is equal to the identifier of the target processor, STEP 512. If there is no match, INQUIRY 514, then no response is sent and processing is complete, STEP 518. However, if there is a match, INQUIRY 514, then a positive response and the encoded number of the ISC bit number i that has been reset is made available to code (e.g., millicode) on the target processor, STEP 516, and processing is complete, STEP 518.

Returning to INQUIRY 508, if the PIA-ISC.i is not equal to 1, then a determination is made as to whether i is equal to X, INQUIRY 520. If it is not equal to X, then i is incremented by, for instance, 1, STEP 522, and processing continues with INQUIRY 506. However, if i is equal to X, then all of the PIA bits indicated by the mask have been processed. Next, the source id in the dequeue command is checked to see if it is equal to the id of the target processor, STEP 530. If there is a match, INQUIRY 532, then a negative response is made available to code on the processor, STEP 534. However, if there is no match, then processing is complete, STEP 518.

Returning to INQUIRY 506, if DQMASK.i is not equal to 1, then a determination is made as to whether i=X, INQUIRY 520. If I is not equal to X, then i is incremented by, for instance, one, STEP 522, and processing continues with INQUIRY 506. However, if i=X, INQUIRY 520, then processing continues with STEP 530.

Referring now to INQUIRY 502, if DQMASK.0 to X is equal to 0, then there are no PIA bits to be reset, and processing continues with STEP 530. This completes processing.

An example of the above processing using DQMASK is described with reference to FIG. 6. As depicted, each source processor (PU0-PU3) has, for instance, a 5 bit DQMASK and a 5 bit PIA initialized to 11100. Example DQMASKs (a.k.a., vectors) for the source processors are as follows: PU0: 11000, PU1: 11100, PU2: 01000, PU3: 00100. All the processors (e.g., PU0-PU3) send out dequeue commands with their dequeue vectors at, for instance, the same time to a serialization point in the system. The serialization point queues these commands, and then sends them back in series to each of the processors. The ordering in which the dequeue commands of the four processors is sent back is random, but all four of the processors see them in the same order.

Continuing with FIG. 6, a plurality of sequences 600a-600d is shown and each sequence is a different example, and each example starts with PIA 11100. Each of sequences 600a-600c includes four clock cycles (x, x+1, x+2, and x+3), and in each cycle, a dequeue command is received by all the processors from a particular source. Further, sequence 600d includes five clock cycles, in which an enqueue command is received in clock cycle x+2.

In one example, in sequence 600a, each processor (processors 0-3, in this example), receives the dequeue command from processor 0 in cycle x; then, in cycle x+1, from processor 1; and in cycle x+2, from processor 2; and in cycle x+3, from processor 3 (see the numbers (0, 1, 2, 3) under DEQUEUE). Similarly, in sequence 600b, each processor receives the dequeue command from processor 1 in cycle x; processor 3 in cycle x+1; processor 2 in cycle x+2; and processor 0 in cycle x+3. In sequence 600c, each processor receives the dequeue command from processor 2 in cycle x; processor 1 in cycle x+1; processor 0 in cycle x+2; and processor 3 in cycle x+3. In sequence 600d, each processor receives the dequeue command from processor 2 in cycle x; and processor 1 in cycle x+1. Then, there is an enqueue in cycle x+2 by any source processor, which sets a pending interrupt indicator in the pending interrupt array. Further, each processor receives the dequeue command from processor 0 in cycle x+3; and processor 3 in cycle x+4.

Further details are provided with reference to sequence 600a. In this sequence, a dequeue command with source id=PU0 is received on each processor (e.g., PU0-PU3) during cycle x. PU0 receives its own dequeue command (source id=PU0) with the dequeue vector (a.k.a., DQMASK) 11000. PU0 turns off the highest priority pending (non-zero) ISC bit being masked with the vector bit (e.g., PIA.0, in this example). The other PIA bits are ignored. A positive result is sent to code (e.g., millicode) on PU0 together with the encoded ISC-bit. The other processors also receive the dequeue command from PU0 and just turn OFF the same (highest priority) ISC bit belonging to the mask. No other action is taken by them.

Continuing with sequence 600a, during cycle x+1, a dequeue command is received by all of the processors from PU1 (source id=PU1). PU1 receives its own dequeue command (source id=PU1) with the dequeue vector 11100, and determines that the highest priority ISC bit for PIA.0 is already cleared. Therefore, the ISC bit (PIA.1) with the next highest priority bit that is masked by PU1's vector bit is turned off. A positive result is sent back to code on PU1 together with the encoded ISC bit. The other processors also receive the dequeue command and just turn OFF the same ISC bit, PIA.1, belonging to the mask.

During cycle x+2, a dequeue command is received by all of the processors from PU2 (source id=PU2). PU2 receives its own dequeue command (source id=PU2) with the dequeue vector 01000. Because PIA.1 is already OFF, PU2 sends back a negative result to code on this PU2. The other processors also receive the dequeue command; however, since it is already OFF, there is nothing that needs to be done.

During cycle x+3, a dequeue command is received by all of the processors from PU3. PU3 receives its own dequeue command (source id=PU3) with the dequeue vector 00100. PU3 turns OFF the bit PIA.2. A positive result is sent back to code on this processor together with the encoded ISC bit. The other processors also receive the dequeue command from PU3 and turn OFF the same ISC bit, PIA.2.

Using one or more aspects of the present invention, the highest priority ISC bit is taken first (in this example, by PU0), but a second dequeue command is still processed by the target processors without the need to exit the interrupt handler (and re-enter for the next pending ISC bit being set and masked), execute a new dequeue command for the next ISC and wait until this dequeue comes back again for evaluation. Processor performance is improved. A single dequeue command can therefore cover multiple ISC bits for the issuing processor without the need to issue multiple dequeue commands.

In one embodiment, a command including a mask indication is obtained by a processor. Responsive to obtaining the mask indication, a set indicator from the mask indication is selected. A determination is made as to whether a pending interrupt indicator corresponding to the set indicator is set. Responsive to the determining indicating the corresponding pending interrupt indicator is not set, the determining is repeated, at least one time for at least one other set indicator, in an attempt to reset a pending interrupt indicator. The repeating is performed without re-issuing the command and, for instance, before receiving another command.

Thus, in one aspect, if a processor finds that the pending indicator that it first checks is already reset, it will check one or more other pending indicators corresponding to the mask bits, if any, until it finds one to reset. Once it resets one, it stops the checking. If there are no pending indicators to reset and the processor is the source processor, it will receive a negative indication.

In one embodiment, if there are no set indicators in the mask indication, then the determining and repeating steps need not be performed. Further, if there is only one set indicator in the mask indication, then the repeating need not be performed.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
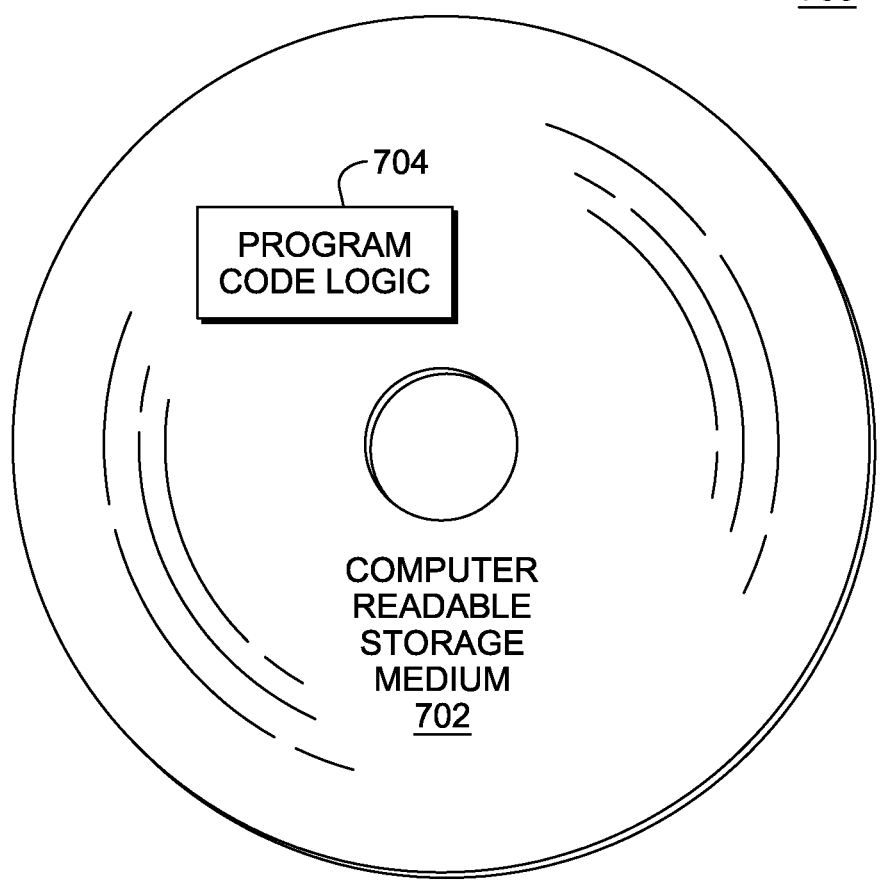
FIG. 7 depicts one embodiment of a computer program product incorporating one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, there may be more or less processors than described herein. Additionally, one or more aspects of the present invention include sending more than one zone/mask combinations with the dequeue command. Moreover, other types of commands may be used to reset the bits.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing of interruptions, said computer program product comprising:

a non-transitory computer readable storage medium readable by a processing circuit and storing instructions for execution by the processing circuit for performing a method comprising:

obtaining, by a processor, a command including a mask indication, the mask indication including a plurality of indicators;

based on obtaining the mask indication, selecting a set indicator from the mask indication;

determining whether a pending interrupt indicator corresponding to the set indicator is set; and based on the determining indicating the corresponding pending interrupt indicator is not set, repeating at least one time for at least one other set indicator in the mask indication the determining in an attempt to reset a pending interrupt indicator, the repeating being performed without re-issuing the command.

2. The computer program product of claim 1, wherein the plurality of indicators comprises a plurality of bits, and wherein a bit of the plurality of bits represents at least one of:
a mask bit in a zone mask table; or
a mask bit in a zone mask table ANDed with a corresponding pending interrupt bit in a pending interrupt array.

3. The computer program product of claim 2, wherein the processor comprises a target processor and the mask indication comprises a dequeue mask vector of a source processor, and wherein the zone mask table is of the source processor and representing one or more zones in which the source processor is enabled for interrupts, and the pending interrupt array is of the source processor and including a plurality of pending interrupt bits.

4. The computer program product of claim 1, wherein based on the repeating, the pending interrupt indicator corresponding to the other set indicator is reset.

5. The computer program product of claim 4, wherein the method further comprises:
determining whether an identifier of the processor is equal to an identifier of a source processor providing the mask indication; and
based on the determining indicating the identifier of the processor is equal to the identifier of the source processor, obtaining by the processor a positive indication of the resetting based on the command.

6. The computer program product of claim 5, wherein the identifier of the source processor is included in the command.

7. The computer program product of claim 1, wherein based on the repeating, no pending interrupt indicator is reset, and said method further comprises:
determining whether an identifier of the processor is equal to an identifier of a source processor providing the mask indication; and
based on the determining indicating the identifier of the processor is equal to the identifier of the source processor, obtaining by the processor a negative indication based on the command.

8. The computer program product of claim 1, wherein a negative indication is not obtained by the processor, based on the determining indicating the pending interrupt indicator is set unless no pending interrupt indicator is reset based on the repeating.

9. The computer program product of claim 1, wherein the mask indication comprises an indicator for each interruption subclass of a processor associated with a zone.

10. The computer program product of claim 1, wherein the obtaining, selecting, determining and repeating are performed by a plurality of target processors that receive the command from a source processor, the command including an identifier of the source processor and the mask indication of the source processor.

11. A computer system for facilitating processing of interruptions, said computer system comprising:
a memory; and
a processor in communications with the memory, wherein the computer system is configured to perform a method, said method comprising:

obtaining, by a processor, a command including a mask indication, the mask indication including a plurality of indicators;

based on obtaining the mask indication, selecting a set indicator from the mask indication;

determining whether a pending interrupt indicator corresponding to the set indicator is set; and based on the determining indicating the corresponding pending interrupt indicator is not set, repeating at least one time for at least one other set indicator in the mask indication the determining in an attempt to reset a pending interrupt indicator, the repeating being performed without re-issuing the command.

12. The computer system of claim 11, wherein the plurality of indicators comprises a plurality of bits, and wherein a bit of the plurality of bits represents at least one of:
a mask bit in a zone mask table; or
a mask bit in a zone mask table ANDed with a corresponding pending interrupt bit in a pending interrupt array.

13. The computer system of claim 12, wherein the processor comprises a target processor and the mask indication comprises a dequeue mask vector of a source processor, and wherein the zone mask table is of the source processor and representing one or more zones in which the source processor is enabled for interrupts, and the pending interrupt array is of the source processor and including a plurality of pending interrupt bits.

14. The computer system of claim 11, wherein based on the repeating, the pending interrupt indicator corresponding to the other set indicator is reset.

15. The computer system of claim 14, wherein the method further comprises:
determining whether an identifier of the processor is equal to an identifier of a source processor providing the mask indication; and
based on the determining indicating the identifier of the processor is equal to the identifier of the source processor, obtaining by the processor a positive indication of the resetting based on the command.

16. The computer system of claim 11, wherein based on the repeating, no pending interrupt indicator is reset, and said method further comprises:
determining whether an identifier of the processor is equal to an identifier of a source processor providing the mask indication; and
based on the determining indicating the identifier of the processor is equal to the identifier of the source processor, obtaining by the processor a negative indication based on the command.

17. The computer system of claim 11, wherein a negative indication is not obtained by the processor, based on the determining indicating the pending interrupt indicator is set unless no pending interrupt indicator is reset based on the repeating.

18. A method of facilitating processing of interruptions, said method comprising:

obtaining, by a processor, a command including a mask indication, the mask indication including a plurality of indicators;

based on obtaining the mask indication, selecting a set indicator from the mask indication;

determining whether a pending interrupt indicator corresponding to the set indicator is set; and based on the determining indicating the corresponding pending interrupt indicator is not set, repeating at least one time for at least one other set indicator in the mask indication the determining in an attempt to reset a pending interrupt indicator, the repeating being performed without re-issuing the command.

19. The method of claim 18, wherein based on the repeating, the pending interrupt indicator corresponding to the other set indicator is reset, and wherein the method further comprises:

determining whether an identifier of the processor is equal to an identifier of a source processor providing the mask indication; and based on the determining indicating the identifier of the processor is equal to the identifier of the source processor, obtaining by the processor a positive indication of the resetting in based on the command.

20. The method of claim 18, wherein based on the repeating, no pending interrupt indicator is reset, and said method further comprises:

determining whether an identifier of the processor is equal to an identifier of a source processor providing the mask indication; and based on the determining indicating the identifier of the processor is equal to the identifier of the source processor, obtaining by the processor a negative indication based on the command.

* * * * *